(12) United States Patent
Sun et al.

(10) Patent No.: US 10,564,415 B2
(45) Date of Patent: Feb. 18, 2020

(54) DISPLAY DEVICE AND DISPLAY SYSTEM

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Pai Sun, Beijing (CN); Jie Yu, Beijing (CN); Yangbing Yu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 218 days.

(21) Appl. No.: 15/647,566

(22) Filed: Jul. 12, 2017

(65) Prior Publication Data
US 2018/0017788 A1 Jan. 18, 2018

(30) Foreign Application Priority Data
Jul. 15, 2016 (CN) .......................... 2016 1 0561419

(51) Int. Cl.
*G02B 27/01* (2006.01)
*G02F 1/03* (2006.01)
*G02F 1/1335* (2006.01)
*G06F 3/041* (2006.01)

(52) U.S. Cl.
CPC ............ *G02B 27/01* (2013.01); *G02F 1/0311* (2013.01); *G02F 1/133512* (2013.01); *G02B 2027/0181* (2013.01); *G06F 3/0412* (2013.01)

(58) Field of Classification Search
CPC ................ G02B 27/01; G02B 27/0172; G02B 2027/013; G02F 1/133512
See application file for complete search history.

(56) References Cited

U.S. PATENT DOCUMENTS

| 2003/0043470 A1* | 3/2003 | Harter, Jr. .............. G02B 27/01 359/630 |
| 2012/0224062 A1 | 9/2012 | Lacoste et al. |

(Continued)

FOREIGN PATENT DOCUMENTS

| CN | 101826316 A | 9/2010 |
| CN | 103207453 A | 7/2013 |

(Continued)

OTHER PUBLICATIONS

First Office Action for Chinese Application No. 201610561419.3, dated Mar. 26, 2018, 7 Pages.

*Primary Examiner* — Gerald Johnson
(74) *Attorney, Agent, or Firm* — Brooks Kushman P.C.

(57) ABSTRACT

The present disclosure provides a display device and a display system. The display device includes a head-up display and a light shielding plate arranged at a light-exiting surface side of the head-up display. The head-up display is configured to display an image, and send information about a shape and a location of the image to the light shielding plate; the light shielding plate is configured to receive the information about the shape and the location of the image, and provide a light transmitting region having a shape and a location identical to those of the image according to the information.

19 Claims, 2 Drawing Sheets

(56) References Cited

U.S. PATENT DOCUMENTS

| | | | |
|---|---|---|---|
| 2012/0320171 A1* | 12/2012 | Lee | G02B 27/2214 |
| | | | 348/54 |
| 2013/0181887 A1 | 7/2013 | Lee et al. | |
| 2014/0152711 A1* | 6/2014 | Sekiya | G02B 27/01 |
| | | | 345/690 |
| 2015/0226965 A1 | 8/2015 | Kim et al. | |
| 2015/0234458 A1 | 8/2015 | Hsieh et al. | |

FOREIGN PATENT DOCUMENTS

| | | |
|---|---|---|
| CN | 104515531 A | 4/2015 |
| CN | 104827967 A | 8/2015 |
| CN | 104865702 A | 8/2015 |
| CN | 204855999 U | 12/2015 |
| JP | 2011203643 A | 10/2011 |
| WO | 2011015843 A2 | 2/2011 |

* cited by examiner

DISPLAY DEVICE AND DISPLAY SYSTEM

CROSS-REFERENCE TO RELATED APPLICATION

This application claims priority to Chinese Patent Application No. 201610561419.3 filed on Jul. 15, 2016, the disclosure of which is incorporated in its entirety by reference herein.

TECHNICAL FIELD

The present disclosure relates to the field of display technology, and more particularly to a display device and a display system.

BACKGROUND

In order to improve a convenience for a driver, a vehicle may be provided with a head-up display (HUD) for displaying information to the driver. With the HUD, information to be displayed may be projected onto a windshield of the vehicle when the driver is driving, so as to facilitate the display of the information within the line of sight of the driver. Thus, the driver does not need to turn the line of sight away from the windshield and look at an instrument on the central dashboard to view required information.

The HUD may present representative vehicle information that is supposed to be displayed in the central dashboard of the vehicle, such as speed information about the vehicle, a fuel level, an engine temperature. In addition, the HUD may also present to the driver the map information and communication events, such as navigation instructions, driving instructions, warnings and alarms.

However, in the related art, the information displayed by the HUD are all of a rectangle shape, therefore it is impossible to realize the display of different shapes that corresponds to shapes of images to be displayed by the HUD.

SUMMARY

In view of the above, the present disclosure provides a display device and a display system for realizing displays of different shapes.

The present disclosure provides in some embodiments a display device, including a head-up display (HUD) and a light shielding plate arranged at a light-exiting surface side of the HUD; wherein the HUD is configured to display an image, and send information about a shape and a location of the image to the light shielding plate; the light shielding plate is configured to receive the information about the shape and the location of the image, and provide a light transmitting region having a shape and a location identical to those of the image according to the information.

In one possible embodiment of the present disclosure, the light shielding plate is a normally white liquid crystal display screen or a normally black liquid crystal display screen.

In one possible embodiment of the present disclosure, the normally white liquid crystal display screen is configured to: provide the light transmitting region by not applying a voltage to a region having a shape and a location corresponding to those of the image, and provide a light shielding region by applying a voltage to regions except the light transmitting region.

In one possible embodiment of the present disclosure, the normally white liquid crystal display screen is further configured to apply a voltage to the light transmitting region to lower a transmittance of the light transmitting region at night or in the case that an ambient brightness value is less than or equal to a pre-determined value.

In one possible embodiment of the present disclosure, the normally black liquid crystal display screen is configured to provide the light transmitting region by applying a voltage to a region having a shape and a location corresponding to those of the image, and provide a light shielding region by not applying a voltage to regions except the light transmitting region.

In one possible embodiment of the present disclosure, the normally black liquid crystal display screen is further configured to: increase the voltage applied to the light transmitting region during the day or in the case that an ambient brightness value is greater than a pre-determined value.

In one possible embodiment of the present disclosure, an area of the light shielding plate is greater than or equal to that of a display screen of the HUD.

In one possible embodiment of the present disclosure, the image is of a circular, triangular, rhombic or hexagonal shape.

Accordingly, the present disclosure further provides in one embodiment a display system including any one of the above display devices.

In one possible embodiment of the present disclosure, the display system further includes an optical system arranged on an optical path of the display device and configured to emit light from the light shielding plate to a windshield of a vehicle-mounted device.

The benefit effects of the present disclosure are as follows. The present disclosure provides in some embodiments a display device and a system. The display device includes: a head-up display (HUD), and a light shielding plate arranged at a light-exiting surface side of the HUD. The HUD is configured to display an image, and send information about a shape and a location of the image to the light shielding plate; the light shielding plate is configured to receive the information about the shape and the location of the image, and provide a light transmitting region having a shape and a location identical to those of the image according to the information. Therefore, in the display device according to some embodiments of the present disclosure, the light shielding plate is arranged at the light-exiting surface side of the HUD, and the shape and the location of the light transmitting region of the light shielding plate are arranged according to those of the image to be displayed by the HUD, which makes the shape of the light transmitted from the light shielding plate identical to that of the image displayed by the HUD, thus filtering out background regions unrelated to the image to realize different shapes of displays, thereby improving the user experience.

DETAILED DESCRIPTION

Figure 1:
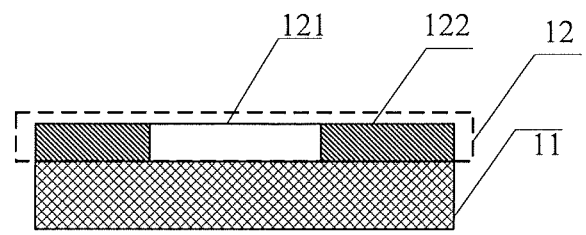
FIG. 1 is a schematic diagram showing a display device according to one embodiment of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

Unless otherwise defined, any technical or scientific terms used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than being limited to physical or mechanical connection. Such words as "on/above", "under/below", "left" and "right" are merely used to represent relative position relationship, and when an absolute position of an object is changed, the relative position relationship will be changed too.

The present disclosure provides in some embodiments a display device and a display system for realizing displays of different shapes.

Specific embodiments of the display device and the display system according to the present disclosure will be described hereinafter in a detail manner in conjunction with the drawings. The shapes and sizes of components in the drawings do not reflect the actual ratio of the display device, which merely aims to schematically describe contents of the present disclosure.

Figure 2:
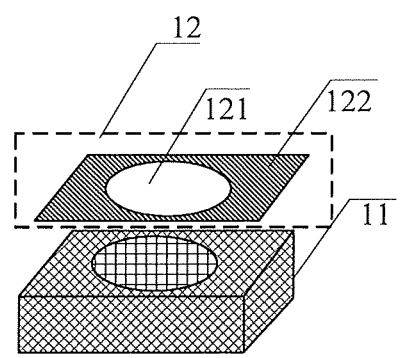
FIG. 2 is a three-dimensional schematic diagram showing the display device shown in FIG. 1.

Referring to FIG. 1 and FIG. 2, a display device according to one embodiment of the present disclosure includes a head-up display (HUD) 11 and a light shielding plate 12 arranged at a light-exiting surface side of the HUD 11. The HUD is configured to display an image, and send information about a shape and a location of the image to the light shielding plate 12. The light shielding plate 12 is configured to receive the information about the shape and the location of the image, and provide a light transmitting region 121 having a shape and a location identical to those of the image according to the information.

The HUD herein may be a commonly seen vehicle-mounted head-up display, and generally includes a data processing unit (e.g., a processor), an image displaying unit (e.g., various displays) and various related circuits.

FIG. 1 is a sectional view of a display device according to one embodiment of the present disclosure. In order to further explain a structure of the display device according to the embodiment of the present disclosure, FIG. 2 shows a three-dimensional structure of the display device. In FIG. 2, a circular shape is taken as an example to schematically illustrate a shape of the light transmitting region 121, but the shape of the light transmitting region 121 is not limited to the circular shape.

Referring to FIG. 1 or FIG. 2, the light shielding plate 12 may include a light transmitting region 121 and a light shielding region 122. In FIG. 2, in order to illustrate the structure of the display device according to the embodiment of the present disclosure from a perspective of three-dimensional effect, a certain distance is shown schematically between the light shielding plate and the HUD. In a practical application, the light shielding plate according to the embodiment of the present disclosure may attached tightly to the light-exiting surface side of the HUD, or the light shielding plate may be arranged at the light-exiting surface side of the HUD with a fixed distance, or the light shielding plate may be fixed on a substrate at the light-exiting surface side of the HUD to become as a part of the HUD device, which shall not be limited herein. The light shielding plate and the HUD may be connected through a hardware or a software to realize a communication between each other.

Specifically, in the case that the HUD needs to display an image, such as a video or a picture, the image needs to be displayed may include a display region and background regions (the regions which is not the display region). In order to merely display the image to be displayed by the HUD, optionally, the HUD only needs to send a shape and a location of the image to be displayed to the light shielding plate, such that the light shielding plate provides a light transmitting region having a shape and a location identical to those of the image. Here, the light shielding plate further includes a light shielding region in addition to the light transmitting region, and the light shielding region filters out the background regions of the image displayed by the HUD. Optionally, when the HUD displays the image, information containing the shape and the location of the image may be sent to the light shielding plate; here the information about the shape of the image may be arranged as a fixed shape according to actual needs, which shall not be specifically limited herein.

According to the embodiments of the present disclosure, the display device includes a head-up display (HUD) and a light shielding plate arranged at a light-exiting surface side of the HUD. The HUD is configured to display an image, and send information about a shape and a location of the image to the light shielding plate; the light shielding plate is configured to receive the information about the shape and location of the image, and provides a light transmitting region having a shape and a location identical to those of the image according to the information. Therefore, in the display device according to the embodiment of the present disclosure, the light shielding plate is arranged at the light-exiting surface side of the HUD, and the shape and the location of the light transmitting region of the light shielding plate are arranged according to those of the image to be displayed by the HUD, which makes the shape of the light transmitted from the light shielding plate according to the embodiment of the present disclosure identical to that of the image displayed by the HUD, thus filtering out background regions unrelated to the image to realize different shapes of displays, thereby improving the user experience.

In one specific embodiment, in the above display device of the present disclosure, the light shielding plate may be a normally white liquid crystal display screen or a normally black liquid crystal display screen. Optionally, the normally white (NW) liquid crystal display screen or the normally black (NB) liquid crystal display screen is capable of flexibly controlling a light transmitting function and a light shielding function of the liquid crystal display screen, and the normally white liquid crystal display screen or the normally black liquid crystal display screen does not require the use of a color film, and simply needs a piece of glass having a high transmittance as an upper substrate. Therefore, a manufacturing process of the color film is eliminated, thus reducing the cost while increasing the transmittance. Therefore, in the embodiment of the present disclosure, the normally white liquid crystal display screen or the normally black liquid crystal display screen is taken as a light shielding plate, thus facilitating the light shielding plate providing different shapes of light transmitting regions, as well as increasing the transmittance of the light transmitting region.

In the case that the image to be displayed is of a certain fixed shape (e.g., a circular or an elliptical shape), the light shielding plate may also be arranged as a substrate having a shape identical to that of the image to be displayed.

In one specific embodiment, in the above display device of the present disclosure, the normally white liquid crystal display screen is configured to: provide the light transmitting region by not applying a voltage to a region having a shape and a location corresponding to those of the image, and provide a light shielding region by applying a voltage to regions except the light transmitting region. Here, the normally white liquid crystal display screen may includes a driving circuit 123, and applying a voltage or not applying a voltage and a magnitude of the applied voltage mentioned above may be realized or controlled by the driving circuit.

Specifically, in some embodiment, the normally white liquid crystal display screen is taken as a light shielding plate. For the normally white liquid crystal display screen, when a voltage is not applied to liquid crystals at a region, light can be transmitted through the liquid crystals, a bright picture is displayed, and the transmittance is high, therefore such region may be taken as a light transmitting region; when a voltage is applied to liquid crystals at a region, light cannot be transmitted through the liquid crystals, a dark picture is displayed, and the transmittance is low, therefore such region may be taken as a light shielding region. Specifically, for the normally white liquid crystal display screen, when no voltage is applied to the liquid crystals, the liquid crystals will be arranged along a horizontal direction, then the light may pass through an upper polarizer and a lower polarizer to the maximum extent and a bright state appears. When a voltage is applied to the liquid crystals, the liquid crystals appear to be arranged in different angles depending on different voltages. The higher the voltage is, the more vertical the arrangement direction tends to be, and the fewer light beams penetrate through the upper polarizer and the lower polarizer. Finally, the arrangement direction of the liquid crystals becomes vertical so that no light can pass therethrough, and a dark state appears.

In one specific embodiment, in order to avoid a brightness of image from the light transmitting region being too dazzling at night or in an environment of an ambient brightness value being low, in some embodiment of the present disclosure, the normally white liquid crystal display screen is further configured to: apply a voltage to the light transmitting region to lower a transmittance of the light transmitting region at night or in the case that an ambient brightness value is less than or equal to a pre-determined value. The pre-determined value may be set by a user depending on the circumstances, or may be set at factory in a unified manner, which shall not be limited herein.

Specifically, according to a grayscale display principle, at night or in an environment of an ambient brightness value being low, the brightness of the image may be changed by changing the transmittance of the light transmitting region. For example, a voltage is applied to liquid crystals in the light transmitting region such that the arrangement direction of the liquid crystals in the light transmitting region gradually tends to be a direction having a certain angle with a horizontal direction from the horizontal direction, thus blocking a part of light, reducing the transmittance of the light transmitting region, lowering the brightness of the light from the light transmitting region, and avoiding the light being too bright and irritating user's eyes. However, when the environment is gradually changed to the daytime or the ambient brightness gets larger than the pre-determined value, the brightness of the image may also be changed by changing the transmittance of the light transmitting region. For example, the voltage applied to liquid crystals may be reduced such that the arrangement direction of the liquid crystals in the light transmitting region gradually tends to be the horizontal direction from the direction having the certain angle to the horizontal direction, thus increasing the transmittance of the light, increasing an brightness value of light from the light transmitting region, and avoiding failing to see the image clearly.

In some embodiments of the present disclosure, the normally black liquid crystal display screen is configured to: provide the light transmitting region by applying a voltage to a region having a shape and a location corresponding to those of the image, and provide a light shielding region by not applying a voltage to regions except the light transmitting region. Here, the normally black liquid crystal display screen may include a driving circuit 123, and applying a voltage or not applying a voltage and a magnitude of the voltage to be applied mentioned above may be realized or controlled by the driving circuit.

Specifically, in some embodiment, the normally black liquid crystal display screen is taken as a light shielding plate. For, the normally black liquid crystal display screen when a voltage is not applied to liquid crystals at a region, light cannot be transmitted through the liquid crystals, a dark picture is displayed, and the transmittance is low, therefore such region may be taken as a light shielding region. when a voltage is applied to the liquid crystals at a region, light can be transmitted through the liquid crystals, a bright picture is displayed, and the transmittance is high, therefore such region may be taken as a light transmitting region. Specifically, for the normally black liquid crystal display screen, when no voltage is applied to liquid crystals, the liquid crystals will be arranged along a vertical direction, then the light cannot pass through an upper polarizer and a lower polarizer because of blocking of the liquid crystals, and a dark state appears. When a voltage is applied to the liquid crystals, the liquid crystals appear to be arranged in different angles depending on different voltages. The higher the voltage is, the more horizontal the arrangement direction of the liquid crystals tends to be, and the more light beams penetrate through the upper polarizer and the lower polarizer. Finally, the arrangement direction of the liquid crystals becomes horizontal such that the light can all pass therethrough, and a bright state appears.

In one specific embodiment, in order to avoid the image displayed being unclear during the day or in an environment of the ambient brightness value being high, in some embodiment of the present disclosure, the normally black liquid crystal display screen is further configured to increase the voltage applied to the light transmitting region during the day or in the case that an ambient brightness value is greater than a pre-determined value. The pre-determined value may be set by a user depending on the circumstances, or may be set at factory in a unified manner, which shall not be limited herein.

Specifically, according to a grayscale display principle, during the day or in an environment of an ambient brightness value being high, the brightness of the image may be changed by changing the transmittance of the light transmitting region. For example, a voltage applied between the liquid crystals in the light transmitting region may be increased such that the arrangement direction of the liquid crystals in the light transmitting region gradually tends to be a horizontal direction from a vertical direction, such that light all pass through the upper polarizer and the lower polarizer, thus increasing the transmittance of the light transmitting region, increasing the brightness of the light emitted from the light transmitting region, and avoiding the light being too dark to display clearly. However, when it gradually changes from day to night or it becomes to be an environment of the ambient brightness value being less than a pre-determined value from an environment of the ambient brightness value being greater than the pre-determined value, the brightness of the image may also be changed by changing the transmittance of the light transmitting region. For example, the voltage increased between the liquid crystals in the light transmitting region may be reduced such that the arrangement direction of the liquid crystals in the light transmitting region gradually tends to be a vertical direction from a horizontal direction, accordingly partial light beams cannot penetrate the upper polarizer and the lower polarizer, thus reducing the transmittance of the light, reducing the brightness of light emitted from the light transmitting region, and avoiding irritating user's eyes due to the too bright light.

Figure 3:
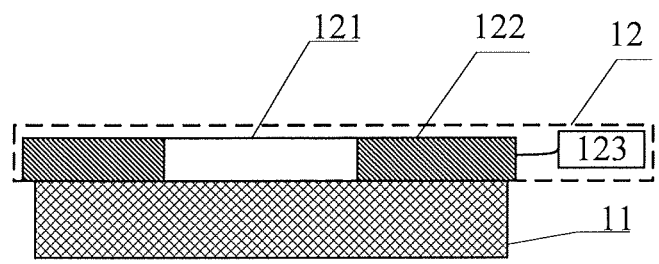
FIG. 3 is another schematic diagram showing the display device according to one embodiment of the present disclosure.

In one specific embodiment, in order to avoid a shape of the light shielding plate being smaller than that of the image displayed by the HUD, thereby resulting in loss of information about the image to be displayed, in some embodiments of the present disclosure, an area of the light shielding plate is greater than or equal to that of a display screen of the HUD. Specifically, referring to FIG. 3, an area of then light shielding plate 12 is greater than that of a display screen of the HUD 11. Here, a thickness of the light shielding plate may be arranged according to the actual situation, which shall not be limited herein.

In some embodiments of the present disclosure, the image may be of a circular, triangular, rhombic or hexagonal shape. Here, the image to be displayed by the HUD may be of any shape, and may be of a regular shape or an irregular shape. For example, in the case that the image to be displayed by the HUD merely is several numbers, then the image is of an irregular shape and is of a shape corresponding to the numbers, and the light transmitting region in the light shielding plate is changed according to the shape of the numbers. And in the case that the image displayed by the HUD is of a mountain path shape, then the image is of an irregular shape, and the light transmitting region in the light shielding plate is of shape identical to the mountain path shape. The shape of the image displayed by the HUD shall not be specifically limited herein.

As described above, the display device according to the embodiment of the present disclosure includes a HUD and a light shielding plate arranged at a light-exiting surface side of the HUD, and the light shielding plate includes a light transmitting region and a light shielding region. Here, a shape and a location of the light transmitting region is arranged according to those of an image displayed in the HUD, such that a shape of light transmitted from the light shielding plate is identical to that of the image to be displayed by the HUD, thus filtering out background regions and other regions unrelated to the image to realize different shapes of displays, thereby improving the user experience. A normally white liquid crystal display screen or a normally black liquid crystal display screen may be adopted as a light shielding plate, thus the shape of the light transmitting region of the light shielding plate can be controlled flexibly, and the cost of the light shielding plate can be reduced.

On the basis of the same invention principle, the present disclosure further provides in one embodiment a display system including any one of the above display devices, detailed description of which shall not be repeated herein.

Figure 4:
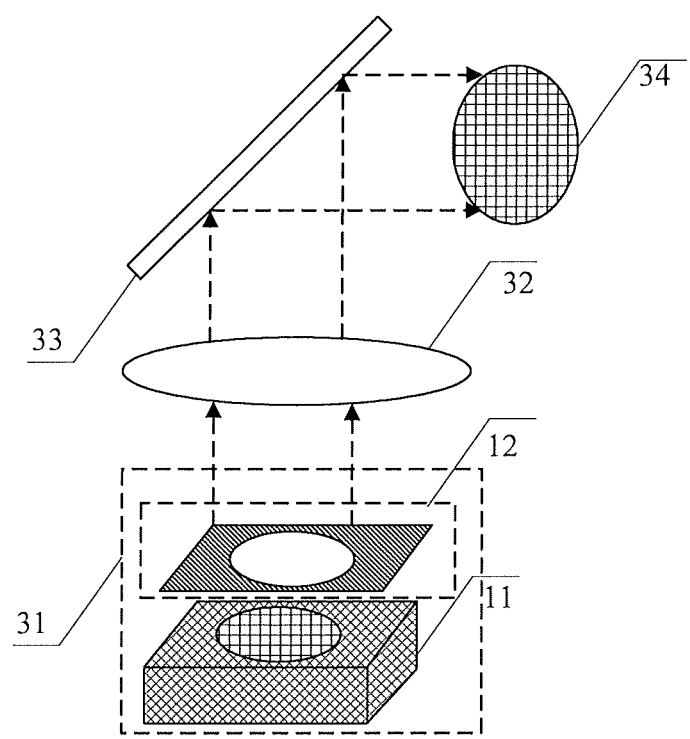
FIG. 4 is a schematic diagram showing a display system according to one embodiment of the present disclosure.

In some embodiments, referring to FIG. 4, the display system may further include an optical system 32 arranged on the optical path of a display device 31, and the optical system is configured to emit light from light shielding plate 12 to a windshield 33 of a vehicle-mounted device. In FIG. 4, Reference numeral 34 represents an image seen by human eyes from the windshield. The optical system transmits light from the light shielding plate onto the windshield according to the location of the light-existing surface side of the display device and the location of the windshield, and finally the light entering into the line of sight of human eyes to realize a display effect of different shapes (various specific shapes).

As described above, one embodiment of the present disclosure provides a display device and a system. The display device includes a head-up display HUD and a light shielding plate arranged at a light-exiting surface side of the HUD. The HUD is configured to display an image, and send information about a shape and a location of the image to the light shielding plate; the light shielding plate is configured to receive the information about the shape and the location of the image, and provide the light transmitting region having an identical shape and location with the image according to the information. Therefore, in the display device according to the embodiment of the present disclosure, the light shielding plate is arranged at the light-exiting surface side of the HUD, and the shape and the location of the light transmitting region of the light shielding plate are arranged according to those of the image to be displayed by the HUD, which makes the shape of the light transmitted from the light shielding plate identical to that of the image displayed by the HUD, thus filtering out background regions unrelated to the image to realize different shapes of displays, and improving the user experience.

Obviously, a person skilled in the art may make improvements and modifications without departing from the principle of the present disclosure, and these improvements and modifications shall also fall within the scope of the present disclosure. The present disclosure also intends to include these improvements and modifications.

What is claimed is:

1. A display device, comprising:
    a head-up display, and
    a light shielding plate arranged at a light-exiting surface side of the head-up display; wherein
    the head-up display is configured to display an image, and send information about a shape and a location of the image to the light shielding plate;
    the light shielding plate is configured to receive the information about the shape and the location of the image, and provide a light transmitting region having a shape and a location identical to those of the image according to the information,
    wherein the light shielding plate is configured to change the shape and the location of the light transmitting region in real time based on the shape and the location of the image to be displayed,
    wherein the light shielding plate is a liquid crystal display screen.

2. The device according to claim 1, wherein the light shielding plate is a normally white liquid crystal display screen or a normally black liquid crystal display screen.

3. The device according to claim 2, wherein the normally white liquid crystal display screen is configured to: provide the light transmitting region by not applying a voltage to a region having a shape and a location corresponding to those of the image, and provide a light shielding region by applying a voltage to regions except the light transmitting region.

4. The device according to claim 3, wherein the normally white liquid crystal display screen is further configured to: apply a voltage to the light transmitting region to lower a transmittance of the light transmitting region at night or in the case that an ambient brightness value is less than or equal to a pre-determined value.

5. The device according to claim 2, wherein the normally black liquid crystal display screen is configured to: provide the light transmitting region by applying a voltage to a region having a shape and a location corresponding to those of the image, and provide a light shielding region by not applying a voltage to regions except the light transmitting region.

6. The device according to claim 5, wherein the normally black liquid crystal display screen is further configured to increase the voltage applied to the light transmitting region during the day or in the case that an ambient brightness value is greater than a pre-determined value.

7. The device according to claim 1, wherein an area of the light shielding plate is greater than or equal to that of a display screen of the head-up display.

8. The device according to claim 1, wherein the image is of a circular, triangular, rhombic or hexagonal shape.

9. The device according to claim 1, wherein the light shielding plate is attached tightly to the light-exiting surface side of the head-up display.

10. A display system, comprising the display device according to the claim 1.

11. The system according to claim 10, further comprising an optical system arranged on an optical path of the display device and configured to emit light from the light shielding plate to a windshield of a vehicle-mounted device.

12. The system according to claim 10, wherein the light shielding plate is a normally white liquid crystal display screen or a normally black liquid crystal display screen.

13. The system according to claim 12, wherein the normally white liquid crystal display screen is configured to provide the light transmitting region by not applying a voltage to a region having a shape and a location corresponding to those of the image, and provide a light shielding region by applying a voltage to regions except the light transmitting region.

14. The system according to claim 13, wherein the normally white liquid crystal display screen is further configured to apply a voltage to the light transmitting region to lower a transmittance of the light transmitting region at night or in the case that an ambient brightness value is less than or equal to a pre-determined value.

15. The system according to claim 12, wherein the normally black liquid crystal display screen is configured to provide the light transmitting region by applying a voltage to a region having a shape and a location corresponding to those of the image, and provide a light shielding region by not applying a voltage to regions except the light transmitting region.

16. The system according to claim 15, wherein the normally black liquid crystal display screen is further configured to: increase the voltage applied to the light transmitting region during the day or in the case that an ambient brightness value is greater than a pre-determined value.

17. The system according to claim 10, wherein an area of the light shielding plate is greater than or equal to that of a display screen of the head-up display.

18. The system according to claim 10, wherein the image is of a circular, triangular, rhombic or hexagonal shape.

19. The system according to claim 10, wherein the light shielding plate is attached tightly to the light-exiting surface side of the head-up display.

* * * * *